United States Patent
Hwang et al.

(10) Patent No.: US 11,859,049 B2
(45) Date of Patent: Jan. 2, 2024

(54) PREPARATION METHOD OF POLYALKYLENE CARBONATE

(71) Applicant: LG CHEM, LTD., Seoul (KR)

(72) Inventors: Woosung Hwang, Daejeon (KR); Dongmin Kim, Daejeon (KR); Seung Young Park, Daejeon (KR); Mi Kyung Kim, Daejeon (KR); Joon Ho Shin, Daejeon (KR); Wonseok Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 364 days.

(21) Appl. No.: 17/273,650

(22) PCT Filed: Jul. 7, 2020

(86) PCT No.: PCT/KR2020/008828
§ 371 (c)(1),
(2) Date: Mar. 4, 2021

(87) PCT Pub. No.: WO2021/033917
PCT Pub. Date: Feb. 25, 2021

(65) Prior Publication Data
US 2021/0340318 A1    Nov. 4, 2021

(30) Foreign Application Priority Data

Aug. 21, 2019  (KR) .................. 10-2019-0102577
Jul. 2, 2020  (KR) .................. 10-2020-0081759

(51) Int. Cl.
*C08G 64/34* (2006.01)
*C08G 64/40* (2006.01)

(52) U.S. Cl.
CPC ........... *C08G 64/34* (2013.01); *C08G 64/406* (2013.01)

(58) Field of Classification Search
USPC ....................................................... 525/414
See application file for complete search history.

(56) References Cited

U.S. PATENT DOCUMENTS

| 6,881,800 B2 | 4/2005 | Friedersdorf |
| 7,163,989 B2 | 1/2007 | Friedersdorf |
| 2011/0054145 A1 | 3/2011 | Chang et al. |

FOREIGN PATENT DOCUMENTS

| JP | 06-298837 A | 10/1994 |
| JP | 2006-104095 A | 4/2006 |
| KR | 10-0769774 A | 10/2007 |
| KR | 10-2008-0017159 A | 2/2008 |
| KR | 20080017159 A * | 2/2008 |
| KR | 10-1308580 B1 | 9/2013 |
| KR | 10-2016-0069250 A | 6/2016 |
| KR | 10-1748408 B1 | 6/2017 |
| KR | 10-1832447 B1 | 2/2018 |
| KR | 10-1938338 B1 | 4/2019 |

OTHER PUBLICATIONS

KR20080017159A machine translation Chun Suk Keun et al. Purification for Ethylene Carbonate With High Purity and Yield From Crude Ethylene Carbonate (Year: 2008).*

* cited by examiner

*Primary Examiner* — Terressa Boykin
(74) *Attorney, Agent, or Firm* — Bryan Cave Leighton Paisner LLP

(57) ABSTRACT

The present disclosure relates to a method for preparing a polyalkylene carbonate. More specifically, provided is a method for preparing a polyalkylene carbonate in which after polymerization of polyalkylene carbonate, a mixture from which unreacted carbon dioxide and residual catalyst have been removed is charged into a stripper to remove the unreacted epoxide compound, and then heat-exchanged before removing the solvent to increase the temperature of the mixture stream to the maximum level, which is subjected to a heating step, following by a solvent removal step, whereby the amount of steam required in the heating step is reduced, side reactions due to unreacted epoxide compounds are prevented, and steam energy can be reduced in the solvent removal step.

11 Claims, 1 Drawing Sheet

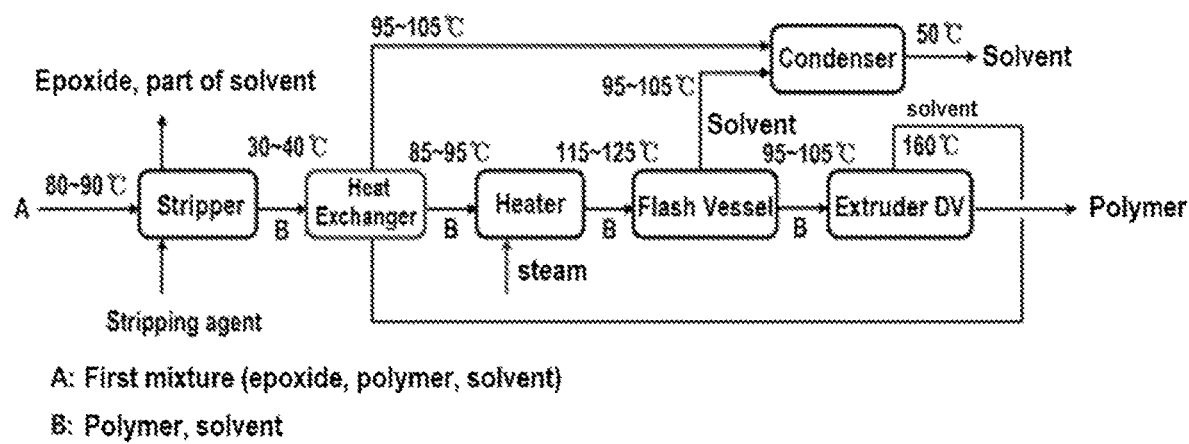

PREPARATION METHOD OF POLYALKYLENE CARBONATE

CROSS-REFERENCE TO RELATED APPLICATION(S)

This application is a National Phase entry pursuant to 35 U.S.C. § 371 of International Application No. PCT/KR2020/008828, filed on Jul. 7, 2020, and claims priority to and the benefit of Korean Patent Application No. 10-2019-0102577, filed on Aug. 21, 2019 and Korean Patent Application No. 10-2020-0081759, filed on Jul. 2, 2020 with the Korean Intellectual Property Office, the disclosures of which are hereby incorporated by reference in their entirety for all purposes as if fully set forth herein.

TECHNICAL FIELD

Technical Field

The present disclosure relates to a method for preparing a polyalkylene carbonate that can prevent side reactions due to unreacted epoxide compounds and reduce steam energy during solvent removal.

Background Art

Polyalkylene carbonate is a non-crystalline transparent resin and has only an aliphatic structure, unlike an aromatic polycarbonate, which is a similar type of engineering plastic. Polyalkylene carbonate is synthesized by a copolymerization reaction using carbon dioxide and epoxide as direct monomers (main raw materials) in the presence of a catalyst. Polyalkylene carbonate has advantages in that it has excellent transparency, elongation, and oxygen barrier properties, exhibits biodegradability, is completely decomposed into carbon dioxide and water during combustion, and leaves no carbon residue.

The process for producing the polyalkylene carbonate is largely divided into a polymerization process and a post-treatment process, and the post-treatment process includes a step of removing residual monomers, solvents, and the like in addition to the polyalkylene carbonate. That is, the polymerization process includes a step of producing a poly-alkylene carbonate by using epoxide and carbon dioxide as monomers, using an organic solvent, and performing polymerization under a catalyst.

Further, after the polymerization, an unreacted residual monomer, a residual catalyst, and an alkylene carbonate as a polymerization by-product are produced together with the polyalkylene carbonate. Therefore, the unreacted monomer, residual catalyst and polymerization by-product are removed together with the solvent used in the reaction.

At this time, the higher the temperature of the unreacted epoxide compound, the higher the possibility that self-polymerization and side reaction formation will occur. Therefore, the epoxide must be removed under the lowest possible temperature condition. Further, in the production of polyalkylene carbonate resin, after the unreacted epoxide compound is removed before proceeding to the high temperature process, steam energy is consumed when removing the solvent in the polymer solution. In order to reduce the production cost, a plan for minimizing the use of steam energy is needed.

However, according to the conventionally used method, to remove residual monomers and solvents, a large amount of energy is required due to sensible heat and latent heat.

DETAILED DESCRIPTION OF THE INVENTION

Technical Problem

It is one object of the present disclosure to provide a method for preparing a polyalkylene carbonate in which unreacted epoxide in the unreacted monomers generated in the process of preparing polyalkylene carbonate is removed using a stripper, and before removing the solvent, the temperature of the mixture stream from which the unreacted epoxide has been removed is increased to a maximum level by using a heat exchanger, thereby reducing the amount of steam used during when removing the solvent.

Technical Solution

Provided herein is a method for preparing a polyalkylene carbonate comprising the steps of:
  polymerizing a monomer containing an epoxide compound and carbon dioxide in a solvent in the presence of an organic zinc catalyst to provide a first mixture containing a polyalkylene carbonate, an unreacted epoxide compound, an unreacted carbon dioxide, a residual catalyst, a by-product and a solvent;
  removing the unreacted carbon dioxide and residual catalyst from the first mixture;
  removing the unreacted epoxide compound from the first mixture from which the unreacted carbon dioxide and residual catalyst have been removed by using a stripper to provide a second mixture containing a polyalkylene carbonate, a by-product, and a solvent;
  heat-exchanging the second mixture;
  heating the heat-exchanged second mixture; and
  removing the solvent and by-product from the heated second mixture.

Advantageous Effects

According to the present disclosure, with respect to the mixture that has undergone the removal step of unreacted residual carbon dioxide and residual catalyst after polymerization of the polyalkylene carbonate, the unreacted epoxide compound is removed with a stripper before the high temperature process for removing the solvent, thereby preventing side reactions of the epoxide compound. In addition, the heating step is performed in a state in which the temperature of the mixture from which the unreacted epoxide compound has been removed is increased to the maximum level using a heat exchanger, thereby reducing the amount of steam used when removing the solvent and contributing to energy reduction.

Further, in the present disclosure, as the unreacted epoxide compound is effectively removed, the content of by-products (polyalkylene glycol) due to the side reaction product of the unreacted epoxide compound can be reduced compared to the prior art, thereby minimizing deterioration in physical properties of the polymer product.

BRIEF DESCRIPTION OF THE DRAWINGS

FIG. 1 shows a simplified structure in which an unreacted epoxide compound and a solvent have been removed in a method for preparing a polyalkylene carbonate according to one embodiment of the present disclosure.

DETAILED DESCRIPTION OF THE EMBODIMENTS

As used herein, terms such as first, second, and the like can be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Although various modifications can be made to the present disclosure and the present disclosure can have various forms, hereinafter, specific embodiments will be illustrated and explained in detail. However, it should be understood that the present disclosure is not limited to specific disclosed forms, and the present disclosure includes all changes, equivalents and substitutions included in the spirit and technical scope of the invention.

Hereinafter, a method for preparing a polyalkylene carbonate according to a preferred embodiment of the present disclosure will be described.

The present disclosure relates to a method for preparing a polyalkylene carbonate in which unreacted epoxide compounds generated in the preparation process of polyalkylene carbonate resins are removed before the high-temperature process, thereby preventing side reactions caused by unreacted epoxide compounds and reduce steam energy during solvent removal.

Specifically, according to one embodiment of the invention, there is provided a method for preparing a polyalkylene carbonate comprising the steps of: polymerizing a monomer containing an epoxide compound and carbon dioxide in a solvent in the presence of an organic zinc catalyst to provide a first mixture containing a polyalkylene carbonate, an unreacted epoxide compound, an unreacted carbon dioxide, a residual catalyst, a by-product and a solvent; removing the unreacted carbon dioxide and residual catalyst from the first mixture; removing the unreacted epoxide compound from the first mixture from which the unreacted carbon dioxide and residual catalyst have been removed by using a stripper to provide a second mixture containing a polyalkylene carbonate, a by-product, and a solvent; heat-exchanging the second mixture; heating the heat-exchanged second mixture; and removing the solvent and by-product from the heated second mixture.

According to the present disclosure, by using a stripper using a stripping agent having a low boiling point, an unreacted epoxide compound is removed at a lower temperature than the prior art, and therefore, side reactions due to the residual epoxide compound can be prevented.

At this time, since carbon dioxide is too light during the polyalkylene carbonate polymerization process, carbon dioxide remaining after the polymerization process can be easily vaporized and removed.

Further, according to the present disclosure, after the unreacted epoxide compound is removed before proceeding to the high temperature process in the preparation of a polyalkylene carbonate resin, the step of increasing the temperature of the polymeric solution containing the polyalkylene carbonate to the maximum level by using a heat exchanger is performed. Through this step, the present disclosure can reduce the amount of steam required for a heater when removing the solvent from the polymer solution. Therefore, the method of the present disclosure can reduce the amount of steam energy used for removing the solvent, and thus contribute to reducing the overall process cost. In addition, the present disclosure can reduce the content of a by-product (polyalkylene glycol) due to a side reaction product of an unreacted epoxide compound, thereby minimizing deterioration in physical properties of a polymer product.

More specifically, the method for preparing the polyalkylene carbonate according to the present disclosure will be described step by step.

First, the present disclosure polymerizes a monomer containing an epoxide compound and carbon dioxide in a solvent in the presence of an organic zinc catalyst, thereby providing a first mixture containing a polyalkylene carbonate, an unreacted epoxide compound, an unreacted carbon dioxide, a residual catalyst, a by-product and a solvent. In this case, the by-product can be removed together with the solvent in the step of removing the solvent.

The by-product can be an alkylene carbonate generated during the preparation of a polyalkylene carbonate. For example, it can include an alkylene carbonate having 2 to 5 carbon atoms. More specifically, the by-product is ethylene carbonate.

The step of providing the first mixture can be carried out through polymerization of a monomer containing carbon dioxide and an epoxide compound under a catalyst and a solvent, according to a method well known in the art.

Further, the method can include a step of removing the unreacted carbon dioxide and the residual catalyst from the first mixture before being charged into a stripper for providing the second mixture. At this time, the residual catalyst can be removed from the second mixture according to a well-known method. Further, the unreacted carbon dioxide can be easily removed using a vaporization method using a compression means (compression system).

Further, the method can further include a step of purifying raw materials before the polymerization step of the monomer. This step is a step of purifying and preparing an epoxide compound and carbon dioxide for use in the reaction.

The polymerization step can be performed at 50 to 100° C. under 20 to 40 bar for 2 to 20 hours.

Through such a step, a polymerization solution of polyalkylene carbonate containing a polyalkylene carbonate, an unreacted epoxide compound, an unreacted carbon dioxide, a residual catalyst, a by-product and a solvent is provided. In addition, the step of removing the unreacted carbon dioxide and the residual catalyst in advance can be further performed before removing the unreacted carbon dioxide.

The epoxide compound used in the polymerization of the polyalkylene carbonate can be one or more selected from the group consisting of an alkylene oxide having 2 to 20 carbon atoms which is unsubstituted or substituted with a halogen or an alkyl group having 1 to 5 carbon atoms; a cycloalkylene oxide having 4 to 20 carbon atoms which is unsubstituted or substituted with a halogen or an alkyl group having 1 to 5 carbon atoms; and a styrene oxide having 8 to 20 carbon atoms which is unsubstituted or substituted with a halogen or an alkyl group having 1 to 5 carbon atoms. More preferably, the epoxide compound can include an alkylene oxide having 2 to 20 carbon atoms which is unsubstituted or substituted with a halogen or an alkyl group having 1 to 5 carbon atoms.

Further, specific examples of the epoxide compound include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxy norbornene, limonene oxide, dieldrin, 2,3-epoxypropylbenzene, styrene oxide, phenyl propylene oxide, stilbene oxide, chlorostilbene oxide, dichloro stilbene oxide, 1,2-epoxy-3-phenoxypropane, benzyloxymethyloxirane, glycidyl-methylphenyl ether, chlorophenyl-2,3-epoxypropyl ether, epoxypropyl methoxyphenyl ether, biphenyl glycidyl ether, glycidyl naphthyl ether, and the like. Preferably, the epoxide compound is ethylene oxide.

The carbon dioxide can be charged continuously or discontinuously during the reaction, but is preferably continuously charged. In this case, it is preferable to use a continuous type or a semi-batch type as the polymerization reactor. If the carbon dioxide is not continuously charged, the production of by-products such as polyethylene glycol can be increased apart from the carbonate copolymerization reaction intended in the present disclosure. In addition, when carbon dioxide is continuously charged in the polymerization, the reaction pressure can be 5 to 50 bar or 10 to 40 bar.

The catalyst used in the present disclosure can include a metal complex compound such as zinc, aluminum, or cobalt, and preferably, a zinc-based catalyst is used. The type of the zinc-based catalyst is not limited, and it can include zinc complex compounds that are well known in the art.

As the solvent, methylene chloride, ethylene dichloride, dioxolane or the like can be used, and more preferably, methylene chloride can be used.

Further, the present disclosure performs a step of removing the unreacted epoxide compound from the first mixture using a stripper to provide a second mixture containing a polyalkylene carbonate, a by-product, and a solvent.

The present disclosure performs a step of first removing the unreacted epoxide compound from the first mixture before proceeding to the high temperature step in the preparation of a polyalkylene carbonate, and then removing the solvent from the polymer solution through a heat exchange step described later, so that side reactions due to unreacted epoxides can be prevented, steam energy consumption can be reduced, and production costs can be reduced. Since the unreacted epoxide monomer is converted to a polyalkylene glycol due to self-polymerization in the subsequent high-temperature step so that the physical properties of the final product can be reduced, it is desirable to minimize and reduce its content in order to improve the physical properties of the product. Thus, the method according to the present disclosure can provide the effect of excellently maintaining the product properties because the content of polyalkylene glycol in the final product is small.

Specifically, according to the present disclosure, a first mixture (mixture solution) that has undergone the step of removing residual unreacted carbon dioxide and a catalyst after polymerization is charged into a stripper. At this time, to prevent side reactions due to unreacted epoxide contained in the first mixture, the first mixture is charged into the stripper under a temperature condition of 90° C. or less, preferably 80 to 90° C., and residual epoxide compounds in the first mixture are first removed.

When the first mixture is charged into a stripper, the problem of self-polymerization of the unreacted epoxide occurs when the temperature condition is 90° C. or higher. This tendency is rapidly accelerated as the temperature rises. Further, even if the temperature is too low, the efficiency of removing unreacted epoxide from the stripper is reduced. This is because as the temperature is lowered, the epoxide removal efficiency is rapidly reduced.

Therefore, when the first mixture is charged into a stripper, it is preferable to increase the charging temperature to the maximum level under the conditions of suppressing the self-polymerization of the unreacted epoxide, but if the range is too high or too low, it causes the above-described problems. Accordingly, in the present disclosure, it is preferable to remove the unreacted epoxide by charging the first mixture into the stripper within the above-described range.

Thus, in the present disclosure, by optimizing the temperature of the first mixture charged into the stripper as described above, the side reaction due to the unreacted epoxide can be reduced and the content of the by-product (polyalkylene glycol) due to the side reaction product of the unreacted epoxide compound can be reduced compared to the prior art, thereby minimizing the deterioration of the physical properties of the polymer product.

Further, the step of removing the unreacted epoxide compound using the stripper can include charging carbon dioxide as a stripping agent. Preferably, the carbon dioxide charged as the stripping agent is unreacted carbon dioxide, and is preferably charged in an amount of 75 to 85% by weight based on the total content of the unreacted carbon dioxide (gas) which is in an uncondensed state.

Specifically, most of the unreacted carbon dioxide is obtained as a gas in an uncondensed state even through a compression means (compression system). Of these, 15 to 25% by weight is purged to prevent concentration, and the remaining 75 to 85% by weight can be utilized as a stripping agent of a stripper.

When the first mixture passes through the stripper, a part of the solvent can be removed together with the unreacted epoxide compound in the first mixture. Therefore, a second mixture containing a polyalkylene carbonate, a by-product, and a solvent can be provided through the above step.

Next, the present disclosure performs a step of heat-exchanging a second mixture containing the polyalkylene carbonate from which the unreacted epoxide compound has been removed, a by-product, and a solvent.

The step of heat-exchanging the second mixture means a step of heat-exchanging a high-temperature vapor stream and a low-temperature liquid stream in the process (heat integration). By performing such a step, the low-temperature liquid stream can be heated to some extent by utilizing the sensible heat and latent heat of the high-temperature vapor stream, so that the amount of steam energy used can be reduced.

Preferably, the heat-exchanging step can include raising the temperature of the second mixture containing the polyalkylene carbonate, by-product and solvent that have passed through the stripper using at least one heat exchanger.

Specifically, the second mixture that has passed through the stripper is obtained at a temperature of 40° C. or less, or about 30 to 40° C. This second mixture can be heated through a heat exchanger and a heater.

The heat exchanger can be installed to connect with a condenser and a means for removing the solvent from the second mixture containing a polyalkylene carbonate, a by-product and a solvent. More specifically, the heat exchanger can be connected through a line connected to the upper part of the means for removing the solvent, and through this line, heat from the means for removing the solvent can be transferred to the heat exchanger. Therefore, the temperature of the second mixture of 40° C. or less charged into the heat exchanger can be raised to the maximum level due to the heat of the means for removing the solvent connected to the heat exchanger. For example, the temperature of the second mixture through the heat exchanger can be about 80° C. or higher or 85 to 95° C. Through this step, the stream temperature of the second mixture is increased to the maximum level, so that the amount of steam required for the heater when removing the solvent contained in the second mixture can be reduced.

Following the above step, it is possible to perform a step of removing the unreacted epoxide compound, and removing the solvent from the polymerization solution (i.e., the heat-exchanged second mixture) whose temperature has risen to the maximum level during heat exchange. That is, after the second mixture is heated through a heat exchanger and a heater in the above step, the solvent is removed by vaporization from the heated second mixture, and by-products can also be removed in this process. More preferably, since the second mixture that has undergone the heat exchange step contains a by-product together with polyalkylene carbonate and the solvent, the by-product can be removed together when removing the solvent.

Specifically, a step of heating a second mixture containing the heat-exchanged polyalkylene carbonate, by-product and solvent; and a step of removing the solvent and by-products from the second mixture containing the heated polyalkylene carbonate, solvent and by-product are performed.

The step of heating the second mixture can be performed through a heater connected to a heat exchanger. The second mixture charged into the heater can be heated through steam connected to the heater.

The second mixture heated by the heater can be charged into a means for removing one or more solvents to perform a step of removing the solvent contained in the second mixture, and in this step, by-products can also be removed.

Preferably, the step of removing the solvent and by-product can include a step of removing the solvent and by-products at least two or more times from the second mixture containing the polyalkylene carbonate and the solvent by utilizing a means for removing one or more solvents.

The step for removing the solvent and by-products can use a combination of one or more devices selected from the group consisting of a flash vessel, a simple flash drum, a falling film evaporator, a thin film evaporator, an extruder DV, and a kneader or a film extruder.

According to an embodiment of the present disclosure, when two kinds of solvents are contained in the second mixture, the step of removing the solvent and by-products can include a step in which the heated second mixture is charged into a means for removing the first solvent to firstly remove the first solvent, and then a second mixture from which the first solvent has been firstly removed is charged into the means for removing the second solvent to secondly remove the remaining solvent and remove by-products.

For example, the second mixture having the temperature range raised to the maximum level in the heat exchanger can be charged into a heater and then charged into a means for removing the solvent at a temperature of about 110° C. or higher or in a temperature range of 115 to 125° C.

Further, the second mixture charged at a temperature of about 110° C. or higher or in a temperature range of 115 to 125° C. is charged into a means for removing the first solvent, and then the solvent is firstly removed. The removed solvent can have a temperature in the range of about 95° C. to 105° C. Such a solvent can be charged into a condenser, liquefied and then recovered as a solvent at about 50° C.

Further, in the second mixture that has passed through the means for removing the first solvent, some are charged into a means for removing the second solvent in a temperature range of about 95 to 105° C., and then the polymer can be recovered after the remaining solvent is removed. At this time, the removed solvent can exhibit a temperature of about 160° C. or higher, and can be recovered through a heat exchanger and a condenser.

Further, the by-product can be removed together with the solvent in a means for removing at least one second solvent.

According to the present disclosure, by performing these steps, the solvent contained in the second mixture can be removed through two steps, and recover after being liquefied through a condenser. The recovered liquid solvent can be reused for the polymerization of polyalkylene carbonate. In addition, since by-products are also removed in the above step, a product having excellent physical properties can be recovered.

Therefore, in the present disclosure, steam energy can be reduced in the step of removing the solvent according to the above-described method, so that the solvent contained in the second mixture can be more economically removed than before.

On the other hand, FIG. 1 briefly shows the structure for removing an unreacted epoxide compound and a solvent in the method for preparing a polyalkylene carbonate according to an embodiment of the present disclosure.

Referring to FIG. 1 a stripper, a heat exchanger, a heater, a flash vessel and an extruder DV are connected and installed, and the solvent removed from the flash vessel and the extruder DV is connected to a condenser, so that a liquid solvent can be recovered.

That is, as described above, the second mixture solution, which has undergone the steps of removing the residual carbon dioxide and removing the catalyst after polymerization, is charged into the stripper at a temperature of 90° C. or less in order to prevent side reactions due to the epoxide compound, thereby firstly removing the residual epoxide compound in the mixture. Subsequently, before the second mixture is charged into the heater, it is heat-exchanged with the high-temperature steam discharged from the second solvent removing means (for example, the upper part of extruder DV) via the heat exchanger to thereby increase the temperature of the second mixture to the maximum level. Through such a step, the amount of steam required by the heater can be reduced.

Next, the solvent is partially removed in the first solvent removal means (flash vessel) through a heater, and the remaining polymer solution can be charged into the second solvent removing means (extruder DV) to remove the remaining solvent.

In FIG. 1, the second solvent removal means is shown as a single extruder DV (Extruder DV) for convenience, but this can include an extruder DV consisting of two or more.

Therefore, the extruder DV, which is the second solvent removal means, can be composed of two or more extruder DVs. Most preferably, the second solvent removal means can use an extruder DV consisting of two. In the first extruder DV among the second solvent removal means, most of the residual solvent is removed from the second mixture from which the organic solvent is first removed, and in the second extruder DV, it is possible to perform a step of removing the remaining solvents and especially by-products together.

In the present disclosure, through the above method, the residual monomer can be removed from the polymerization mixture of polyalkylene carbonate, and then the solvent can be recovered in a liquid form. In addition, the recovered solvent can be reused in polymerization reaction.

Hereinafter, preferred examples of the present disclosure will be described in detail. However, these examples are for illustrative purposes only, and the scope of the present disclosure will not be construed as being limited by these examples.

Example 1

In accordance with the process diagram of FIG. 1, residual carbon dioxide, residual EO, catalyst, by-product and solvent (MC) were removed from the first mixture containing residual carbon dioxide, residual EO, catalyst, solvent, and polymer (PEC) obtained after a typical PEC polymerization process.

At this time, the first mixture of FIG. 1 includes those provided by the following method.

A polymerization reaction was carried out using a diethylzinc catalyst, a solvent, ethylene oxide (EO) and carbon dioxide, and a solvent (methylene chloride) to prepare PEC. Then, residual unreacted carbon dioxide and residual catalyst were removed by a conventional method. Thus, the first mixture was a mixture that has undergone a step of removing residual carbon dioxide and a catalyst after PEC polymerization, and a mixture in a stream state in which the residual EO content was 1,200 kg/hr, the solvent (dioxolane) content was 19,400 kg/hr, and the PEC polymer content was 2,400 kg/hr was used.

That is, the first mixture containing residual EO, a solvent, and a polymer (PEC) was charged into the stripper at a temperature of 90° C. At this time, unreacted carbon dioxide was used as a stripping agent and supplied to a stripper under the condition of 4,000 kg/hr (80% by weight of unreacted carbon dioxide gas in the uncondensed state was charged). Through the above process, 1,140 kg/hr of EO and 4,100 kg/hr of some solvent (MC) were removed. By these processes, a second mixture was obtained.

Here, the first and second mixtures contain ethylene carbonate (EC) as a by-product.

After passing through the stripper, the temperature of the second mixture was about 30 to 40° C. In order to heat the second mixture passed through the stripper, a heat exchanger was used to heat-exchange with the vapor at 160° C. discharged to the upper part of the extruder DV. Through the heat exchange process, the temperature of the mixture was raised to 85 to 95° C. Then, the temperature of the mixture was raised to 115 to 125° C. via a heater, and steam was used as a temperature raising means.

Thereafter, a second mixture passed through the heat exchanger was charged into a flash vessel, and the solvent (MC) was removed by 5,500 kg/hr. The temperature of the second mixture passed through the flash vessel was 95 to 105·, and this was charged into an extruder DV and operated at 160° C. to completely remove the remaining solvent. The solvent vapor removed here was utilized for heat exchange as mentioned above. In addition, the solvent removed in the form of vapor from the flash vessel and the extruder DV was recovered as a liquid solvent at 50° C. using a condenser. The recovered solvent can be reused in the polymerization reaction. Here, the extruder DV is an extruder DV consisting of two, and in the first extruder DV, most of the residual solvent (MC) was removed from the second mixture in which the solvent was removed through a flash vessel. In the second extruder DV, the remaining solvent (MC) and ethylene carbonate (EC) as a by-product were removed together.

Example 2

The process was performed in the same manner as in Example 1, except that when using unreacted carbon dioxide as a stripper, 75% by weight of the unreacted carbon dioxide gas in the uncondensed state was charged into the stripper (supplied under the condition of 3400 kg/hr).

Example 3

The process was performed in the same manner as in Example 1, except that when using unreacted carbon dioxide as a stripper, 85% by weight of the unreacted carbon dioxide gas in the uncondensed state was charged into the stripper (supplied under the condition of 4800 kg/hr).

Example 4

The process was performed in the same manner as in Example 1, except that the first mixture containing residual EO, solvent, and polymer (PEC) was charged into a stripper at a temperature of 80° C.

Comparative Example 1

The mixture containing residual EO, solvent, and polymer (PEC) was charged directly to a heater without passing through a stripper or heat exchanger, and the temperature was raised to 115 to 125° C.

Then, the mixture was charged into a flash vessel to remove 9,600 kg/hr of the solvent. At this time, the amount of solvent remaining in the mixture passed through the flash vessel was the same as in Example 1.

And, the temperature of the mixture was 95 to 105·, and this was charged into the extruder DV and operated under the condition of 160° C. to completely remove the remaining solvent.

The solvent removed in the form of vapor from the flash vessel and the extruder DV was recovered as a liquid solvent (50° C.) using a condenser.

Comparative Example 2

The mixture containing residual EO, solvent, and polymer (PEC) was heat-exchanged with steam (160° C.) discharged to the upper part of the extruder DV using a heat exchanger without passing through a stripper. At this time, the temperature of the mixture was raised to 85 to 95·.

Thereafter, the liquid solvent was recovered in the same manner as in Comparative Example 1 from the process of charging the mixture into a heater.

Comparative Example 3

A mixture containing a residual EO, a solvent, and a polymer (PEC) was charged into a stripper at a temperature of 90° C. At this time, $CO_2$ was used as a stripping agent and supplied at 4,000 kg/hr to the stripper. Through the above process, 1,140 kg/hr of EO and 4,100 kg/hr of solvent (MC) were removed.

After passing through a stripper, the temperature of the mixture was about 30 to 40·. The mixture passed through the stripper was immediately charged into a heater, and the temperature of the mixture was raised to 115 to 125° C.

Subsequent process was performed in the same manner as in Example 1, except that steam discharged from the extruder DV was not utilized for heat exchange (because the heat exchanger was not configured), and thereby, a liquid solvent was recovered.

Reference Example 1

The process was performed in the same manner as in Example 1, except that when using unreacted carbon dioxide as a stripper, 70% by weight of the unreacted gas in the uncondensed state was charged into the stripper (supplied under the condition of 2850 kg/hr).

Reference Example 2

The process was performed in the same manner as in Example 1, except that the first mixture containing a residual EO, a solvent, and a polymer (PEC) was charged into a stripper at a temperature of 100° C.

Experimental Example 1

With respect to Examples 1 to 3, Comparative Examples 1 to 3, and Reference Example 1, the amount of steam energy used by the heater and the content of the EO side reaction product contained in the mixture are shown in Table 1 below. (device configuration, use amount of steam energy, PEG content in polymer products (EO side reaction products))

As shown in Table 1, in the case of Example 1, the conversion of unreacted EO to PEG (side reaction) was minimized by configuring the stripper and the heat exchanger before the heater, and at the same time, steam energy in the heater was minimized. In the case of Example 2, if the ratio of utilizing a stripping agent in the unreacted carbon dioxide gas in an uncondensed state was slightly reduced, the amount of the stripping agent charged into the stripper was reduced, so the EO removal efficiency slightly decreased. As a result, EO that was not removed had a slightly higher PEG content in the product as it proceeds to subsequent the high-temperature process, but the range of PEG content (within 2 wt %) of a normal product normally required can be satisfied. Further, in Example 2, the amount of heater steam energy used can be reduced.

In the case of Example 3, the charging amount of the stripping agent was slightly increased, so that the EO removal efficiency was slightly higher. However, it was confirmed that also in the case of Example 3, the PEG content in the product can be reduced while reducing the amount of heater steam energy used, as compared with Comparative Examples 1 to 4, thereby exhibiting a remarkable effect. At this time, if the amount vaporized to the upper part of the stripper increases (in addition to EO, some solvents are also contained and vaporized), the polymer solution solids content (TSC) is increased and the temperature is lowered, resulting in the increase of the viscosity. This should be careful as it can cause problems such as fouling in stripper operation. Therefore, even if the charging amount of the stripping agent is increased too much, it becomes a problem, and thus, the charging amount of the stripping agent must be adjusted within the scope of the present disclosure.

TABLE 1

| | Device configuration | Use amount of steam energy in heater kg/hr | PEG content in products wt % |
|---|---|---|---|
| Example 1 | Stripper + Heat exchanger + Heater + Flash Vessel + Extruder DV + Condenser (Stripping agent: 80 wt % of unreacted carbon dioxide gas in an uncondensed state was charged) | 1,100 | 1.2 |
| Example 2 | Stripper + Heat exchanger + Heater + Flash Vessel + Extruder DV + Condenser (Stripping agent: 75 wt % of unreacted carbon dioxide gas in an uncondensed state was charged) | 1,080 | 2.0 |
| Example 3 | Stripper + Heat exchanger + Heater + Flash Vessel + Extruder DV + Condenser (Stripping agent: 85 wt % of unreacted carbon dioxide gas in an uncondensed state was charged) | 1,120 | 1.0 |
| Comparative Example 1 | Heater + Flash Vessel + Extruder DV + Condenser | 2,250 | 16.7 |
| Comparative Example 2 | Heat exchanger + Heater + Flash Vessel + Extruder DV + Condenser | 1,000 | 16.7 |
| Comparative Example 3 | Stripper + Heater + Flash Vessel + Extruder DV + Condenser | 2,100 | 1.2 |
| Reference Example 1 | Stripper + Heat exchanger + Heater + Flash Vessel + Extruder DV + Condenser (Stripping agent: 70 wt % of unreacted carbon dioxide gas in an uncondensed state was charged) | 1,050 | 3.2 |

In contrast, in the case of Comparative Example 1, it can be seen that as the stripper and the heat exchanger are not configured, the PEG content in the product is increased and the amount of steam energy used in the heater is higher. Further, in the case of Comparative Example 2, it can be seen that the PEG content in the product is high as the stripper is not configured. In the case of Comparative Example 3, it can be seen that the amount of steam energy used in the heater is high as heat integration using a heat exchanger is excluded. In the case of Reference Example 1, since the charging amount of the stripping agent was smaller than that of Example 2, the PEG content of the product was finally increased to a level of 3%.

Experimental Example 2

Comparison of the effect according to the temperature when the first mixture is charged into the stripper With respect to Examples 1 and 4 and Reference Example 2, the amount of steam energy used in the heater and the amount of EO side reaction products contained in the mixture are shown in Table 2 below. (device configuration, use amount of steam energy, PEG content in polymer products (EO side reaction products))

TABLE 2

| | Device configuration | Use amount of steam energy in heater kg/hr | PEG content in products wt % |
|---|---|---|---|
| Example 1 | Stripper + Heat exchanger + Heater + Flash Vessel + Extruder DV + Condenser (Stripping agent: 80 wt % of unreacted carbon dioxide gas in an uncondensed state was charged, charging temperature of first mixture: 90° C.) | 1,100 | 1.2 |
| Example 4 | Stripper + Heat exchanger + Heater + Flash Vessel + Extruder DV + Condenser (Stripping agent: 80 wt % of unreacted carbon dioxide gas in an uncondensed state was charged, charging temperature of first mixture: 80° C.) | 1,100 | 1.7 |
| Reference Example 2 | Stripper + Heat exchanger + Heater + Flash Vessel + Extruder DV + Condenser (Stripping agent: 80 wt % of unreacted carbon dioxide gas in an uncondensed state was charged, charging temperature of first mixture: 100° C.) | 1,100 | 5.0 |

According to Table 2, in the case of Reference Example 2 where the temperature at the time of charging the first mixture as a stripper is 90° C. or higher, the self-polymerization of the unreacted epoxide contained in the first mixture is accelerated, and the PEG content is increased before being charged into the stripper, so that the PEG content in the final product was high. Therefore, the polyalkylene carbonate according to Reference Example 2 can be deteriorated in physical properties.

On the other hand, when the temperature at the time of charging the first mixture into the stripper is set to 90° C. or less, preferably 80 to 90° C. as in Examples 1 and 4, the amount of steam energy used in the heater and the PEG content in the product can be reduced by minimizing the self-polymerization of unreacted epoxides.

In addition, in the present disclosure, by optimizing the charging temperature of the first mixture charged into the stripper, it is possible to suppress the self-polymerization of unreacted epoxides than before. Thus, by reducing the amount of PEG produced (EO side reaction product) in the subsequent high-temperature process, the deterioration of the physical properties of the final polymer product can be minimized.

The invention claimed is:

1. A method for preparing a polyalkylene carbonate comprising the steps of:
    polymerizing a monomer containing an epoxide compound and carbon dioxide in a solvent in the presence of an organic zinc catalyst to provide a first mixture containing a polyalkylene carbonate, an unreacted epoxide compound, an unreacted carbon dioxide, a residual catalyst, a by-product and a solvent;
    removing the unreacted carbon dioxide and the residual catalyst from the first mixture;
    removing the unreacted epoxide compound from the first mixture from which the unreacted carbon dioxide and the residual catalyst are removed by using a stripper to provide a second mixture containing the polyalkylene carbonate, the by-product, and the solvent;
    heat-exchanging the second mixture;
    heating the heat-exchanged second mixture; and
    removing the solvent and the by-product from the heated second mixture,
    wherein the step of removing the unreacted epoxide compound comprises charging carbon dioxide into the stripper as a stripping agent.

2. The method for preparing a polyalkylene carbonate according to claim 1, wherein the carbon dioxide charged as the stripping agent is the unreacted carbon dioxide, and is charged in an amount of 75 to 85% by weight based on the total content of the unreacted carbon dioxide which is in an uncondensed state.

3. The method for preparing a polyalkylene carbonate according to claim 1, wherein the first mixture from which the unreacted carbon dioxide and the residual catalyst are removed is charged into the stripper under the condition of a temperature of 90° C. or less.

4. The method for preparing a polyalkylene carbonate according to claim 1, wherein the heat-exchanging step comprises:
  a step of raising the temperature of the second mixture that have passed through the stripper using at least one heat exchanger.

5. The method for preparing a polyalkylene carbonate according to claim 4, wherein the heat exchanger is installed to connect with a condenser and a means for removing the solvent from the second mixture.

6. The method for preparing a polyalkylene carbonate according to claim 1, wherein the step of removing the solvent and the by-products comprises a step of removing the solvent and the by-products at least two or more times from the second mixture using a means for removing one or more solvents.

7. The method for preparing a polyalkylene carbonate according to claim 6, wherein the step for removing the solvent and the by-products uses one or more devices selected from the group consisting of a flash vessel, a simple flash drum, a falling film evaporator, a thin film evaporator, an extruder DV, a kneader and a film extruder.

8. The method for preparing a polyalkylene carbonate according to claim 1, wherein the step for removing the solvent and the by-products comprises a step in which the heated second mixture is charged into a means for removing a first solvent to firstly remove the first solvent, and then a second mixture from which the first solvent is removed is charged into a means for removing a second solvent to secondly remove the remaining solvent and remove the by-products.

9. The method for preparing a polyalkylene carbonate according to claim 8, wherein the means for removing the first solvent is a flash vessel, and the means for removing the second solvent is an extruder DV.

10. The method for preparing a polyalkylene carbonate according to claim 9, wherein the extruder DV consists of two or more extruder DVs.

11. The method for preparing a polyalkylene carbonate according to claim 1, wherein,
  the epoxide compound is one or more selected from the group consisting of an alkylene oxide having 2 to 20 carbon atoms which is unsubstituted or substituted with a halogen or an alkyl group having 1 to 5 carbon atoms; a cycloalkylene oxide having 4 to 20 carbon atoms which is unsubstituted or substituted with a halogen or an alkyl group having 1 to 5 carbon atoms; and a styrene oxide having 8 to 20 carbon atoms which is unsubstituted or substituted with a halogen or an alkyl group having 1 to 5 carbon atoms, and
  wherein the solvent is methylene chloride, ethylene dichloride, or dioxolane.

* * * * *